Feb. 3, 1948.　　A. HOTCHKISS, JR., ET AL　　2,435,354
TURRET ATTACHMENT FOR DRILL PRESSES
Filed July 30, 1945　　2 Sheets-Sheet 2
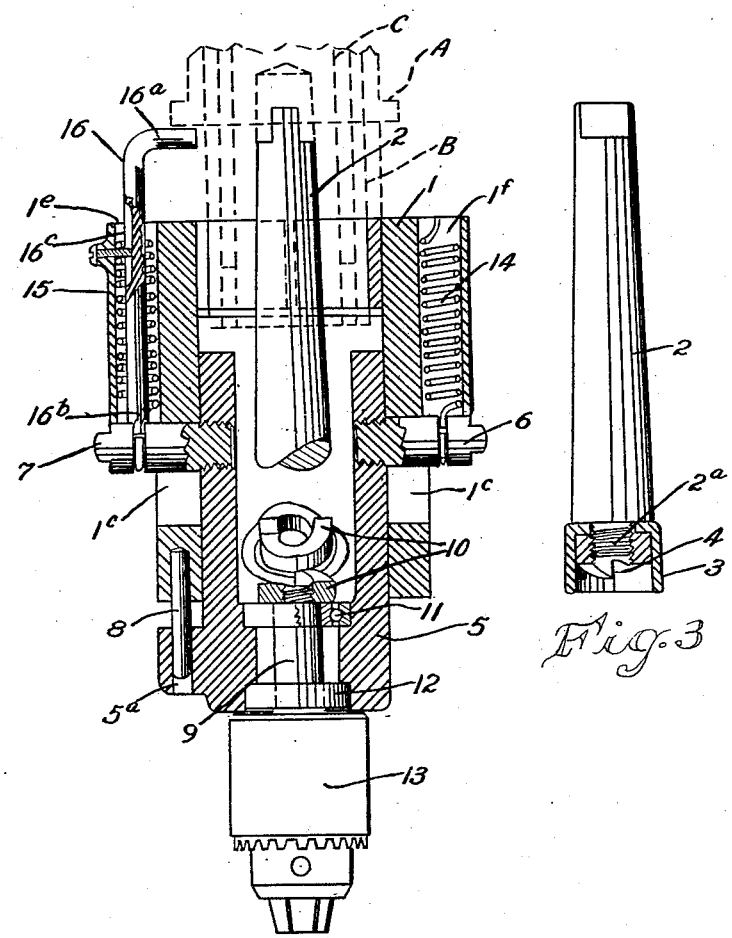
INVENTOR.
Arch Hotchkiss Jr. &
BY Harold E. Haynes
A. B. Bowman
ATTORNEY Patented Feb. 3, 1948

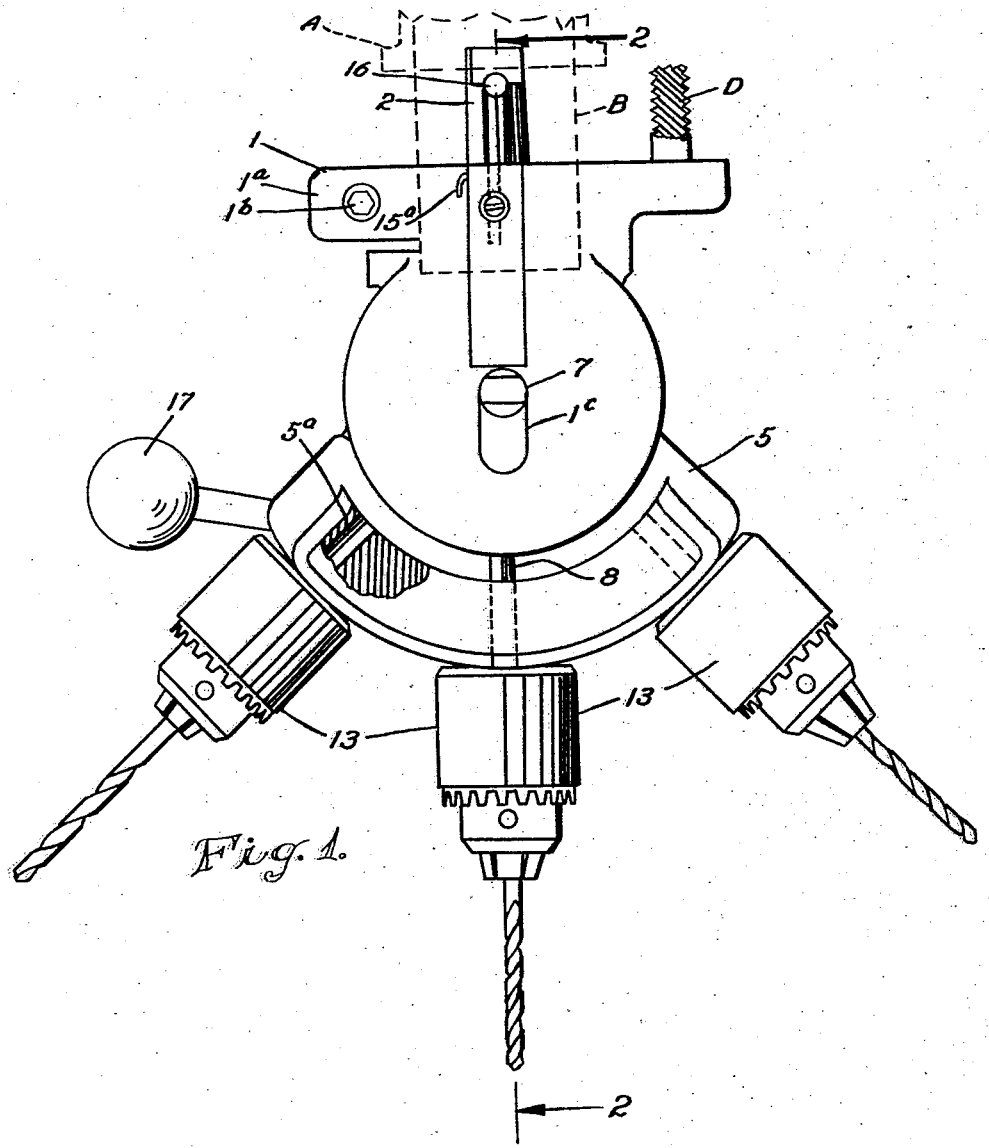

2,435,354

UNITED STATES PATENT OFFICE 2,435,354

TURRET ATTACHMENT FOR DRILL PRESSES

Arch Hotchkiss, Jr., and Harold E. Haynes, San Diego, Calif., assignors to Reconstruction Finance Corporation, Los Angeles, Calif., a corporation of the United States and Arch Hotchkiss, Jr.

Application July 30, 1945, Serial No. 607,808

9 Claims. (Cl. 77—25)

Our invention relates to a turret attachment for drill presses, more particularly for use in the operation of a variety of tools on a single central drill press, and the objects of our invention are:

First, to provide an attachment of this class which is readily and easily attached to a conventional drill press;

Second, to provide an attachment of this class which provides the maximum of speed in changing from one tool to another or from one drill size to another, as desired;

Third, to provide an attachment of this class which is positively indexed to provide axial alignment of the various tools in connection therewith with respect to the axis of the drill press when in operation;

Fourth, to provide an attachment of this class which is very simple and positive in operation;

Fifth, to provide an attachment of this class in which the indexing means is released by an upward movement of the drill press shank providing very fast relieving and indexing of various tools in connection with said attachment;

Sixth, to provide a novel driving arbor means in combination with an indexing means for operation of our turret attachment of drill presses; and Seventh, to provide an attachment of this class which is very simple and economical of construction, efficient in its action and which will not readily deteriorate or get out of order.

With these and other objects in view as will appear hereinafter, our invention consists of certain novel features of construction, combination and arrangement of parts and portions as will be hereinafter described in detail and particulrly set forth in the appended claims, reference being had to the accompanying drawings and to the characters of reference thereon forming a part of this application in which:

Figure 1 is a side elevational view of our turret attachment for drill presses showing portions of a conventional drill press by dash lines; Fig. 2 is a vertical sectional view taken from the line 2—2 of Fig. 1 showing portions broken away and in section to facilitate the illustration and showing by dash lines a portion of a conventional drill press; and Fig. 3 is a side elevational view of the arbor of our turret attachment for drill presses showing portions thereof broken away and in section to amplify the illustration.

Similar characters of reference refer to similar parts and portions throughout the several views of the drawings:

The attachment frame member 1, arbor 2, arbor clutch members 3 and 4, spindle frame member 5, bearing pins 6 and 7, indexing pins 8, chuck shaft 9, chuck shaft clutch member 10, chuck shaft bearings 11 and 12, chuck 13, springs 14 and 15, index relieving plunger 16 and the changing handle 17 constitute the principal parts and portions of our turret attachment for drill presses.

The attachment frame member 1 is provided with a clamp portion 1a through which extends a clamp bolt 1c adapted to secure the attachment frame member 1 on the main shank B of the drill press A, as shown by dash lines in Fig. 1 of the drawings. It will be here noted that the drill press A is a conventional drill press and that the shank B is vertically shiftable relatively with the frame of said drill press A. Connected with the attachment frame member 1 is the stop bolt D which is a conventional stop bolt provided with adjustable stop nuts thereon for controlling the depth of travel of the drills in relation with the work being machined. This bolt D passes through a yoke in connection with the drill press frame, all of which is conventional and common to various drill presses. The attachment frame member 1 is provided with vertically slotted portions 1c and 1d in which the bearing pins 7 and 6 are mounted, as shown best in Fig. 2 of the drawings. These bearing pins 6 and 7 are screw-threaded into the central frame member 5 at their inner ends and are engaged by the springs 14 and 15 at their outer ends which are disposed in vertical bores 1e and 1f in the attachment frame member 1. As shown in Fig. 1 of the drawings, the spring 15 is secured at the upper end of the bore 1e by means of the end portion 15a thereof and the opposite end of these springs 14 and 15 are positioned around the bearing pins 6 and 7 in antioned grooves therein, all as shown best in Fig. 2 of the drawings.

The springs 14 and 15 are tension springs and tend to hold the bearing pins 6 and 7 in the upper ends of the slotted portions 1c of the attachment frame member 1.

Secured in connection with the attachment frame is the indexing pin 8 which is arranged in parallel alignment with the axis of the drill press and this indexing pin 8 extends into indexing holes 5a in the spindle frame member 5 which holes 5a are in parallel alignment with the chuck 13, as shown best in Figs. 1 and 2 of the drawings.

The arbor 2 is a substantially conventional tapered arbor and is provided with a screw-threaded end portion 2a on which the arbor clutch member 4 is screw-threaded for retaining the substantially cup-shaped arbor clutch member 3 in position, as shown best in Fig. 3 of the drawing. The arbor clutch member 4 is a circular ratchet type of clutch similar to the chuck shaft clutch members 10, as shown in Fig. 2 of the drawings and is provided with two vertically disposed teeth interconnected by helical incline, all as shown best in Figs. 2 and 3 of the drawings. When in the position as shown in Fig. 2 of the drawings, the arbor clutch member 4 is adapted to engage chuck shaft clutch member 10 for common rotation of the arbor 2 together with the chuck shaft 9 and chuck 13. The arbor 2 is frictionally engaged in the revolving shaft C which is vertically movable together with the shank B of the drill press. The chuck shafts 9 are supported in combination radial and thrust bearings 11 and 12 and are held therein by means of the screw-threaded relation of the chuck shaft clutch members 10 on the opposite ends thereof from the chuck 13, as shown best in Fig. 2 of the drawings.

The index relieving plunger 16 is provided with an angularly extending end portion 16a which engages the frame of the drill press A at its upper end and the lower end 16b of this index relieving plunger 16 engages the bearing pins 7. The index receiving plunger 16 is provided with a vertical slot 16c in which the screw 16d extends for alignment of said plunger 16 in the attachment frame member 1, as shown best in Fig. 2 of the drawings. The index changing handle 17 is rigidly connected with the spindle frame members 5, as shown best in Fig. 1 of the drawings. It will be here noted that each of the chucks 13 is rotatably mounted on a shaft 9 supported by bearings 11 and 12 and these chucks 13 are adapted to hold various sized tools, as desired.

The operation of our turret attachment for drill presses is substantially as follows: When the arbor 2 is rotating in connection with the drill press spindle and the chuck shaft 9, the tool in connection with the chuck 13 may be forced downwardly into the work in the conventional manner by the conventional operating handle of the drill press. When it is desired to change tools, the operating handle of the drill press is forced in the opposite direction retracting the vertically movable shank B upwardly whereupon the attachment frame member 1 is carried upwardly relatively to the drill press frame A causing the spindle relieving plunger 16 to shift downwardly in the bore 1e of the attachment frame member 1 which forces the bearing pin 7 together with the spindle frame member 5 and bearing pin 6 downwardly whereupon the bearing pins 6 and 7 reach the bottom ends of the flats 1c in the attachment frame member 1 and the lower end of the indexing pins 8 then clear the upper end of the indexing hole 5a in the spindle frame member 5 permitting the operator to grasp the handle 17 and rotate the spindle frame member 5 about the axis of the bearing pins 6 and 7 until the indexing pin 8 is in alignment with one of the other indexing holes 5a and one of the other chucks 13. Then the operating handle of the drill press is released permitting the springs 14 and 15 to retract the bearing pins 6 and 7 upwardly in the slots 1c and forcing the indexing pin 8 downwardly in the newly selected indexing holes 5a. Thus the operator changes from one drill size to another or from one tool to another simply by shifting and radially indexing the desired tool about the axis of the bearing pins 6 and 7. It will be noted that when the spindle frame member is shifted downwardly relatively to the attachment frame member 1, the arbor clutch member 4 disengages from the chuck shaft clutch member 10 permitting the rotative movement of the spindle frame 5 about the axis of the bearing pins 6 and 7. It will be here noted that when the outward clutch member 4 is in engagement with the chuck shaft clutch members 10, that the arbor clutch member 3 surrounds the chuck shaft clutch 10 maintaining alignment of said arbor clutch member 4 and said chuck shaft clutch member 10.

Though we have shown and described a particular construction, combination and arrangement of parts and portions, we do not wish to be limited to the particular construction, combination and arrangement but desire to include in the scope of our invention the construction, combination and arrangement substantially as set forth in the appended claims.

Having thus described our invention, what we claim as new and desire to secure by Letters Patent is:

1. In a turret attachment for drill presses, the combination of an attachment frame member adapted to be attached to the vertically movable shank of the drill press, a spindle frame member having a plurality of chuck shafts journalled therein, bearing pins in connection with said spindle frame member vertically shiftably mounted in connection with said attachment frame member and rotatable relatively thereto, an indexing pin axially parallel with said movable shank engaging both said attachment frame member and said spindle frame member and an arbor in connection with the rotating spindle of said drill press having clutch means in connection therewith engageable with said chuck shaft.

2. In a turret attachment for drill presses, the combination of an attachment frame member adapted to be attached to the vertically movable shank of the drill press, a spindle frame member having a plurality of chuck shafts journalled therein, bearing pins in connection with said spindle frame member vertically shiftably mounted in connection with said attachment frame member and rotatable relatively thereto, an indexing pin axially parallel with said movable shank engaging both said attachment frame member and said spindle frame member, an arbor in connection with the rotating spindle of said drill press having clutch means in connection therewith engageable with said chuck shaft, and spring means in connection with said attachment frame member and said bearing pin for holding said spindle frame member upwardly relatively to said attachment frame member.

3. In a turret attachment for drill presses, the combination of an attachment frame member adapted to be attached to the vertically movable shank of the drill press, a spindle frame member having a plurality of chuck shafts journalled therein, bearing pins in connection with said spindle frame member vertically shiftably mounted in connection with said attachment frame member and rotatable relatively thereto, an indexing pin engaging both said attachment frame member and said spindle frame member, an arbor in connection with the rotating spindle of said drill press having clutch means in connection therewith engageable with said chuck shaft, spring means in connection with said attachment frame member and said bearing pin for holding said spindle frame member upwardly relatively to said attachment frame member, and an index releasing plunger arranged to engage the frame of the drill press at its upper end and cooperatively connected to said spindle frame member at its lower end.

4. In a turret attachment for drill presses, the combination of an attachment frame member secured in connection with the vertically movable shank of a conventional drill press, a spindle frame member having bearing pins, said attachment frame member having vertically slotted portions in which said bearing pins are vertically shiftable and rotatively mounted, said spindle frame member having a plurality of chuck shafts in connection therewith, the upper ends of said chuck shafts having clutch members thereon and an arbor in connection with the rotating spindle on said conventional drill press having ratchet clutch means at its lower end engageable with the clutch member on said chuck shaft.

5. In a turret attachment for drill presses, the combination of an attachment frame member secured in connection with the vertically movable shank of a conventional drill press, a spindle frame member having bearing pins, said attachment frame member having vertically slotted portions in which said bearing pins are vertically shiftable and rotatively mounted, said spindle frame member having a plurality of chuck shafts in connection therewith, the upper ends of said chuck shafts having clutch members thereon, an arbor in connection with the rotating spindle on said conventional drill press having clutch means at its lower end engageable with the clutch member on said chuck shaft, and an indexing pin axially parallel with said movable shank engaging said attachment frame and said spindle frame members for aligning said arbor with one of said chuck shafts.

6. In a turret attachment for drill presses, the combination of an attachment frame member secured in connection with the vertically movable shank of a conventional drill press, a spindle frame member having bearing pins, said attachment frame member having vertically slotted portions in which said bearing pins are vertically shiftable and rotatively mounted, said spindle frame member having a plurality of chuck shafts in connection therewith, the upper ends of said chuck shafts having clutch members thereon, an arbor in connection with the rotating spindle on said conventional drill press having clutch means at its lower end engageable with the clutch member on said chuck shaft, and an indexing pin axially parallel with said movable shank engaging said attachment frame and said spindle frame members for aligning said arbor with one of said chuck shafts, said arbor and said chuck shaft provided with helical ratchet clutch means.

7. In a turret attachment for drill presses, the combination of an attachment frame member secured in connection with the vertically movable shank of a conventional drill press, a spindle frame member having bearing pins, said attachment frame member having vertically slotted portions in which said bearing pins are vertically shiftable and rotatively mounted, said spindle frame member having a plurality of chuck shafts in connection therewith, the upper ends of said chuck shafts having clutch members thereon, an arbor in connection with the rotating spindle on said conventional drill press having clutch means at its lower end engageable with the clutch member on said chuck shaft, an indexing pin axially parallel with said movable shank engaging said attachment frame and said spindle frame members for aligning said arbor with one of said chuck shafts, said arbor and said chuck shaft provided with helical ratchet clutch means, and springs in connection with said bearing pins and said attachment frame member for holding said bearing pins upwardly in said slotted portions of said attachment frame member maintaining said clutch means of said arbor and said chuck shaft in engagement.

8. In a turret attachment for drill presses, the combination of an attachment frame member secured in connection with the vertically movable shank of a conventional drill press, a spindle frame member having bearing pins, said attachment frame member having vertically slotted portions in which said bearing pins are vertically shiftable and rotatively mounted, said spindle frame member having a plurality of chuck shafts in connection therewith, the upper ends of said chuck shafts having clutch members thereon, an arbor in connection with the rotating spindle on said conventional drill press having clutch means at its lower end engageable with the clutch member on said chuck shaft, an indexing pin engaging said attachment frame and said spindle frame members for aligning said arbor with one of said chuck shafts, said arbor and said chuck shaft provided with helical ratchet clutch means, springs in connection with said bearing pins and said attachment frame member for holding said bearing pins upwardly in said slotted portions of said attachment frame member maintaining said clutch means of said arbor and said chuck shaft in engagement, and an index relieving plunger engageable at its upper end with the frame of said conventional drill press and engaging one of said bearing pins at its lower end whereby the vertical elevation of said attachment frame member forces said bearing pin together with said spindle frame member downwardly relatively to said attachment frame member for disengaging said clutch means and said indexing pin.

9. In a turret attachment for drill presses, the combination of an attachment frame member adapted to be attached to the vertically movable shank of the drill press, a spindle frame member having a plurality of chuck shafts journalled therein, bearing pins in connection with said spindle frame member vertically shiftably mounted in connection with said attachment frame member and rotatable relatively thereto, an indexing pin engaging both said attachment frame member and said spindle frame member, an arbor in connection with the rotating spindle of said drill press having clutch means in connection therewith engageable with said chuck shaft, and an index releasing plunger in engagement with said spindle frame and engageable with a stationary portion of said drill press for disengaging said indexing pin when said movable shank is shifted upwardly.

ARCH HOTCHKISS, JR.
HAROLD E. HAYNES.

REFERENCES CITED

The following references are of record in the file of this patent:

UNITED STATES PATENTS

| Number | Name | Date |
| --- | --- | --- |
| 1,673,761 | Dowd | June 12, 1928 |
| 2,303,565 | Luna | Dec. 1, 1942 |
| 1,209,650 | Eisler | Dec. 19, 1916 |